O. R. BERGER.
COOKING UTENSIL.
APPLICATION FILED JULY 23, 1917.

1,341,731.

Patented June 1, 1920.

Witness:
H. L. Farrington

Inventor,
Otto R. Berger
By Brown Nissen & Sprinkle
Attys

UNITED STATES PATENT OFFICE.

OTTO R. BERGER, OF CHICAGO, ILLINOIS, ASSIGNOR TO RAYMOND J. BISCHOFF, OF CHICAGO, ILLINOIS.

COOKING UTENSIL.

1,341,731. Specification of Letters Patent. Patented June 1, 1920.

Application filed July 23, 1917. Serial No. 182,161.

*To all whom it may concern:*

Be it known that I, OTTO R. BERGER, a subject of the Emperor of Germany, residing at Chicago, in the county of Cook and State of Illinois, have invented certain new and useful Improvements in Cooking Utensils, of which the following is a specification.

This invention relates to a cooking utensil in which the contents are subjected to a percolating action because of the shape of the bottom piece, and the principal objects of the invention are to facilitate the cooking of materials therein and to prevent scorching, burning, and over-boiling of the materials.

Other objects of the invention will appear hereinafter.

The invention consists in the novel construction, combination and arrangement of the parts.

Figure 1:
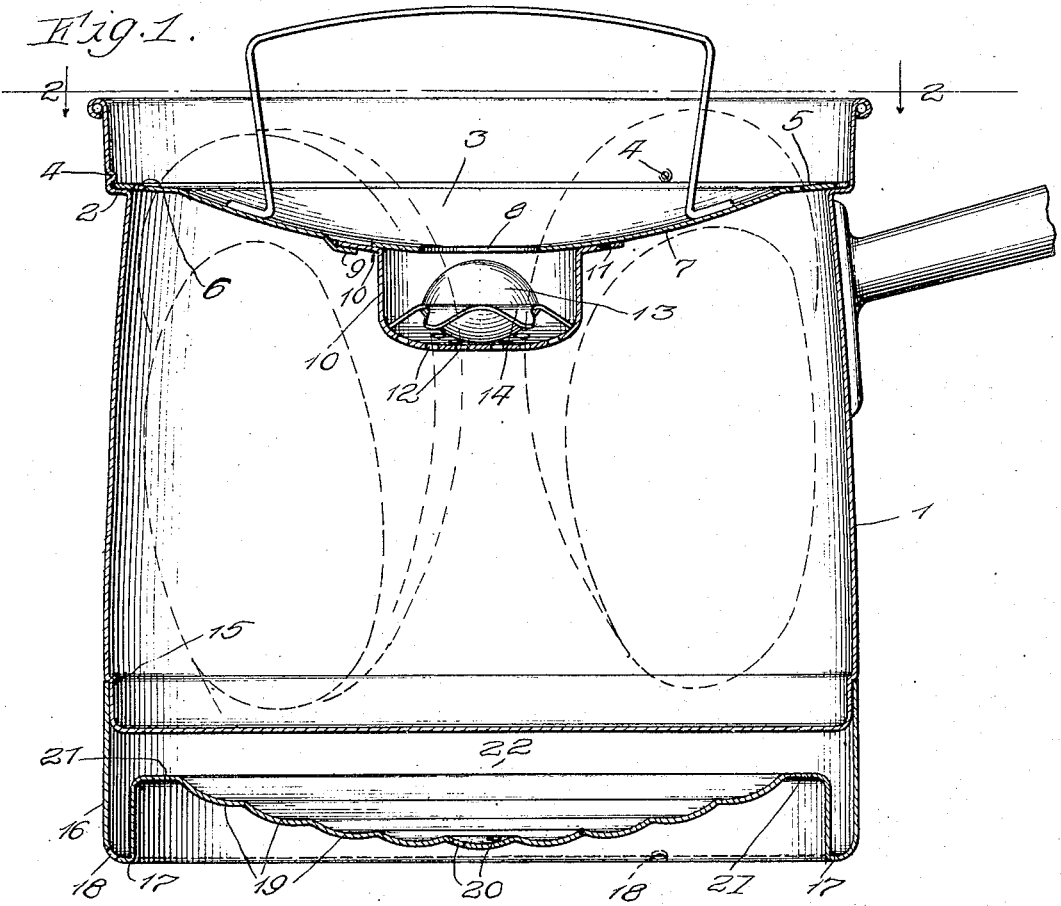
Figure 2:
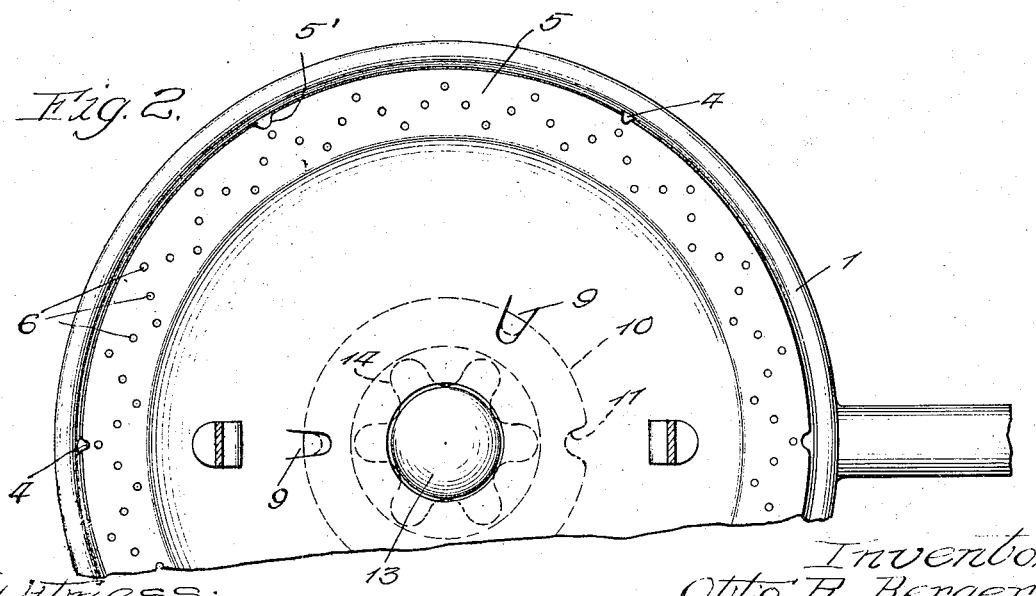

In the accompanying drawing, Figure 1 is a sectional view of a cooking utensil constructed in accordance with the principles of my invention, and Fig. 2 is a view taken on the line 2, 2 of Fig. 1.

In the present invention the percolating action is obtained by distributing the heat and directing it from the center of the vessel toward the sides, at the bottom thereof, and in providing a lid with perforations at the periphery inclined downwardly at the center and with an opening at the center to admit the liquid which boils over around the edge of the lid to the central portion of the vessel through the central opening in the lid. It is found that in such a vessel material can be brought to the boiling point more quickly, and the tendency to scorch or burn is very materially reduced. The principal results are obtained by the use of a bottom piece which is attached to the bottom of the vessel and is of such a shape that the flame or heat is directed to the periphery of the bottom of the vessel rather than to the center thereof.

A vessel 1 is provided at its top with a shouldered portion 2, upon which a lid 3 is seated and held in place by spaced indentations 4 over which the lid is insertible because of its spaced notches 5'.

Around the periphery of the lid 3 is a downwardly inclined portion 5 in which are a plurality of perforations 6. Extending inwardly and downwardly from the perforated portion 5 is a main inclined portion 7 with a central perforation 8. A number of tongues 9 are bent downwardly from the lid for holding a basket 10 also provided with a notch 11 by means of which the basket can be removably engaged with the tongues 9. In the bottom of the basket are a plurality of perforations 12 through which liquid is admitted from the top of the lid to the interior of the vessel at the center thereof. In the basket 10 is a float 13 provided with a downwardly and outwardly extending irregular rim 14 which prevents the float from passing through the opening 8 in the lid and also holds it in proper position when the float is raised or lowered. The float prevents overboiling through the central perforation 8.

At the bottom of the vessel it is preferably formed with a reduced portion 15 to which is secured on the outside of the vessel a bottom piece 16 held in place by pressing it tightly on the vessel, or by shrinking it on. This bottom piece 16 is preferably of steel or other suitable heat-resisting material which can be pressed into shape, and it is intended to form a substantial continuation of the outside of the vessel itself, when applied thereto, as shown in Fig. 1. Around the edge of the bottom piece is a flattened portion 17 upon which the vessel rests, curved upwardly at the outside with a number of perforations 18 in the curved portion to permit free passage of air or liquid therethrough even though the vessel may be resting firmly upon the flattened edge 17. The central portion of this bottom piece is formed with a number of corrugations 19 and with central perforations 20. The central portion of this bottom piece is inclined downwardly from adjacent the edge, with a flat portion 21 nearest to the periphery of the bottom of the vessel itself, so that a space 22 is formed between the piece 16 and the bottom of the vessel, in which the parts named are spaced apart the greatest distance at their centers and are nearest at their peripheries. This causes a flame which is applied to the bottom piece 16 to be directed upwardly from the central portion of the bottom piece and against the portion 21 of the bottom piece which is nearest the bottom of the vessel. This causes the distribution of heat applied to the bottom piece, so that the greatest heat is applied to the bottom of the vessel at the periphery thereof.

The inclination of the central portion of the lid 3 is also about the same as that of the bottom piece 16, so that when the liquid in the vessel boils through the perforations 6 of the lid because of the application of heat to the periphery of the bottom of the vessel, this liquid will flow downwardly through the perforation 8 of the lid unless the boiling is sufficiently violent to raise the float 13 and close the opening 8. In such case the liquid will accumulate on top of the lid until sufficient pressure is applied to the float 13 by reason of the accumulated liquid, to cause the float to fall, thereby admitting the liquid to the interior of the vessel and to the center thereof. Thus it will be seen that the circulation of liquid will be set up in the vessel, and even though the liquid boils through the lid the same circulation will be maintained and there will be no tendency to boil over the top of the vessel.

The spacing of the bottom piece from the bottom of the vessel causes a distribution of the heat which produces the desired circulation in the vessel, and the openings 18 and 20 in the bottom piece 16 not only permit a free circulation of air therein, but also form openings for the escape of water or other liquid which may collect therein due to condensation, or may be admitted thereto while it is being washed. These openings are so located that liquid will escape therefrom when the vessel is resting on the flattened edge 17. Even though this bottom piece is heated extremely hot, it will not be appreciably loosened from the vessel because of the corrugations in the bottom which prevent it from being drawn therefrom, as does also the hollow flange upon which it rests, because they allow expansion and contraction of these portions without communicating this movement to that portion of the bottom piece which is in contact with the vessel proper.

I claim:

1. A bottom piece adapted for application to a cooking vessel, having an outer hollow flange with its bottom edge touching a plane, and a central portion inclined downwardly from the inner flange wall toward the center and extending just above the plane at the lower edge of the flange forming a space between this portion and the bottom of a vessel to which the bottom piece is applied.

2. A separate pressed metal bottom for a cooking utensil with a hollow outer flange one wall of which is adapted to extend around the edge above the bottom of the cooking vessel and the other wall of which terminates at its upper edge below the bottom of said vessel, and a central portion attached to said upper edge and inclined downwardly in concentric waves from that portion of the flange which terminates below the bottom of the vessel forming a space between said portion and said vessel bottom and extends to a point above the lower plane of the flange upon which it rests.

3. A bottom piece adapted for application to a cooking utensil having an outer hollow flange with its bottom edge substantially in a plane, and a central portion inclined downward from the inner flange wall to the center and terminating just above said plane adapted to form a space between this portion and the bottom of a vessel to which the bottom piece is attached.

4. In combination, a cooking vessel, and a bottom piece for directing heat from the center toward the periphery of but not directly against the bottom of the vessel, said bottom piece comprising a concentrically corrugated central portion inclined upwardly from the center thereof and with an outer hollow flange which extends below the plane of the center of the bottom piece forming an edge upon which it rests.

5. A bottom piece for attachment to a cooking vessel having a hollow outer flange and a concentrically corrugated central portion extending upwardly from the center thereof to meet the inside wall of the flange to direct heat toward the periphery, the said central portion being entirely above the lowermost plane of the flange and spaced below the bottom of a vessel to which the piece is attached.

6. A separate pressed metal bottom for permanent attachment to a cooking vessel having a hollow depending peripheral flange the upper outside edge of which is attachable to the outside of a vessel and with a central corrugated portion inclined upwardly from the center thereof to meet the inner wall of the flange forming a heat pocket below the vessel bottom which is of greatest depth at the center, the outside lower edge of the flange wall and the center of the said central portion being provided with perforations.

7. In combination, a vessel, a separate bottom piece therefor with a peripheral downwardly extending hollow flange and a central portion inclined downwardly from the inner wall of the flange and spaced from the bottom of the vessel, the lowest portion of which is above the bottom of the flange for directing heat from the center toward the periphery of the bottom of the vessel, and a perforated lid having a central portion inclined downwardly from the periphery at substantially the same inclination and in the same direction as the inclined portion of the bottom piece for returning overboiling liquid from the periphery through a perforation at the center.

8. A bottom piece for a cooking vessel formed with a peripheral hollow flange which extends some distance below the vessel, and with a concentrically corrugated central portion forming a hollow space below the vessel and inclined from the inner wall of the flange downwardly toward the center thereof, the lowest portion of the center being above the lower plane of the flange upon which the bottom piece rests thus directing heat toward the inner wall of the flange.

9. A pressed metal bottom piece for a cooking vessel with a peripheral hollow flange the outer wall of which extends on the outside above the bottom of a vessel to which it is applied and the inner wall of which terminates at its upper edge below the bottom of such a vessel, and a concentrically corrugated central portion attached to said upper edge and extending inwardly and downwardly from the inner wall of said flange, the lowermost portion of the corrugated part being above the lowermost plane of the flange to direct heat away from the center and toward the inner walls of the flange, the outer lowermost edge of the flange and the center of the corrugated portion being provided with perforations for discharging liquid therefrom when the bottom piece is resting on the plane of its lower edge.

In testimony whereof I have signed my name to this specification, on this 20th day of July, A. D. 1917.

OTTO R. BERGER.